(12) United States Patent
Kimura et al.

(10) Patent No.: US 8,972,040 B2
(45) Date of Patent: Mar. 3, 2015

(54) CONTROL SYSTEM FOR A MACHINE TOOL

(75) Inventors: Akira Kimura, Yamatokoriyama (JP); Katsuhiko Ono, Yamatokoriyama (JP)

(73) Assignee: Mori Seiki & Co., Ltd., Yamatokoriyama-Shi Nara (JP)

( * ) Notice: Subject to any disclaimer, the term of this patent is extended or adjusted under 35 U.S.C. 154(b) by 571 days.

(21) Appl. No.: 13/332,261

(22) Filed: Dec. 20, 2011

(65) Prior Publication Data
US 2012/0197421 A1 Aug. 2, 2012

(30) Foreign Application Priority Data

Jan. 28, 2011 (JP) ................................. P2011-016912

(51) Int. Cl.
*G05B 19/4099* (2006.01)
*G05B 19/4093* (2006.01)

(52) U.S. Cl.
CPC ............................... *G05B 19/40932* (2013.01)
USPC .......................................... 700/188; 700/187

(58) Field of Classification Search
None
See application file for complete search history.

(56) References Cited

U.S. PATENT DOCUMENTS

| | | | |
|---|---|---|---|
| 6,202,002 B1 * | 3/2001 | Fainstein et al. | 700/175 |
| 6,266,572 B1 * | 7/2001 | Yamazaki et al. | 700/96 |
| 6,291,959 B1 * | 9/2001 | Yoshida et al. | 318/569 |
| 6,662,073 B1 * | 12/2003 | Fujishima et al. | 700/173 |
| 7,269,471 B2 * | 9/2007 | Kadono | 700/159 |
| 7,299,108 B2 * | 11/2007 | Geissdorfer et al. | 700/188 |
| 7,391,175 B2 * | 6/2008 | Ueda | 318/432 |
| 7,595,602 B2 * | 9/2009 | Xu | 318/571 |
| 8,538,574 B2 * | 9/2013 | Hahn | 700/159 |
| 8,682,456 B2 * | 3/2014 | Kimura | 700/57 |
| 2002/0002420 A1 | 1/2002 | Hirai et al. | |
| 2003/0033049 A1 * | 2/2003 | Shimomura | 700/187 |
| 2004/0204786 A1 * | 10/2004 | Nakamura | 700/159 |

FOREIGN PATENT DOCUMENTS

EP        1324168 A2      7/2003

OTHER PUBLICATIONS

Y. Altintas et al.,"Virtual Machine Tool", Manufacturing Automation Laboratory—The University of British Columbia, Department of Mechanical Engineering, Vancouver, Canada, Laboratory for Machine Tools and Production Engineering, Chair for Machine Tools Aachen University of Technology, Aachen, Germany.

T. Moriwaki,"Multi-Functional machine tool", CIRP Annals—Manufacturing Technology 57 (2008), pp. 736-749, ScienceDirect, journal homepage: http://ees.elsevier.com/cirp/default.asp.

* cited by examiner

*Primary Examiner* — Ryan Jarrett
(74) *Attorney, Agent, or Firm* — Haverstock & Owens LLP

(57) ABSTRACT

An optimum cutting feed rate of a machine tool is calculated at the outset and a tool path as well as the optimum cutting feed rate calculated is directly output to a driving unit of the machine tool. A relative movement between the work and a tool is made to occur along the tool path at the optimum cutting feed rate for each part of the tool path. To this end, a control system includes a CL data generating unit 32, a CL data memory 33, a driving capability data memory 34, a cutting feed rate data generation unit 35, a cutting feed rate data memory 36, and a controller 42.

5 Claims, 8 Drawing Sheets

CONTROL SYSTEM FOR A MACHINE TOOL

BACKGROUND OF THE INVENTION

1. Field of the Invention

This invention relates to a control system for a machine tool in which an optimum feed rate of cutting of the machine tool is calculated at the outset, a tool path as well as an optimum feed rate of cutting calculated is directly output to a driving unit of the machine tool, and in which a work and the tool are relatively moved along the tool path at an optimum cutting feed rate at each part of the tool path.

2. Description of Related Art

A conventional machine tool includes a CNC controller that controls the driving of the driving motor based on NC (numerical control) data composed of NC programs termed 'G code'. If, in such conventional machine tool, a free curved surface, for example, is to be cut, an operating command is issued at each of a number of extremely short line segments, as shown in Patent publication 1. The CNC controller is instructed by NC data so as to render the cutting feed rate constant. On receiving the NC data, the CNC controller of the conventional machine tool actuates a driving motor, via a motor amplifier, in accordance with input NC data.

However, in the CNC controller of a conventional machine tool, the G code is pre-read, at the time of the machining operation, so that the cutting feed rate is slowed down from the command value in such a manner that the values of the acceleration as well as those of the speed, allocated to the respective driving shafts, will not exceed respective marginal values thereof. The reason may be such that the CNC controller of a conventional machine tool uses an interpreter system in which an input NC program is sequentially analyzed and executed. On the other hand, even though the limits of the acceleration and the speed of the driving unit that actuates the respective driving shafts may be known beforehand, there lack data on the mass weight or the inertial force of a moving object, such as a work, during the machining operations. It is thus not possible to calculate the limit of the torque generated with acceleration beforehand.

Thus, in the conventional machine tool, the cutting feed rate is dropped by a value more than is necessary than the command value.

When e.g., a corner of a work being machined is cut, the acceleration will theoretically become infinitely large unless the work is brought to a standstill. For this reason, a CNC controller of a conventional machine tool provides for a cutting mode of starting the operation of the next driving shaft before the outstanding operation (mode G64) is brought to a standstill at the corner of the work. That is, the corner of the work is rounded in a compromising fashion in order to raise the speed of the operations.

In such cutting mode, an R not inherently present in an engineering drawing is formed only in a compromising fashion by the CNC controller in order to speed up the operation. Hence, the finishing shape of the work tends to deviate from what has been intended by the designer. In addition, since the R produced at the corner of the work is set in a sloppy manner, there persists a problem that the final shape may not be surmised until the time the work has ultimately been cut.

RELATED TECHNICAL PUBLICATION

Patent Publication

[Patent Publication 1]
Japanese Laid-Open Patent Application 2006-11808

SUMMARY OF THE INVENTION

Problem to be Solved by the Invention

The present invention has been made to overcome the above mentioned status of the related technique. It is an object of the present invention to provide a control system for a machine tool in which an optimum cutting feed rate for a machine tool is calculated beforehand based on a tool path and data regarding the driving capability of the driving unit of the machine tool. The tool path and the optimum cutting feed rate calculated are directly output to the driving unit of the machine tool. The work and the tool are relatively moved along the tool path at a cutting feed rate optimum for each part of the tool path. The time taken by the machining operations is to be shorter and the accuracy in the machining operations is to be higher than in the conventional system.

Means to Solve the Problem

To accomplish the above object, the present invention provides a control system for a machine tool in which data driving a driving unit of the machine tool that causes relative movement between a work and a cutting tool is generated and output to the driving unit to control the machine tool. The control system includes a CL data generating unit that generates CL data including a tool path in a work coordinate system based on shape data regarding a post-machining shape of the work.
The control system also includes a CL data memory that stores the CL data generated by the CL data generating unit, and a driving capability data memory that memorizes driving capability data regarding the driving capability of a driving unit of the machine tool from the outset. The control system further includes a cutting feed rate data generation unit that, based on the CL data stored in the CL data memory and on the driving capability data stored in the driving capability data memory, generates cutting feed rate data in each part of the tool path of the CL data. The control system further includes a cutting feed rate data memory that memorizes the cutting feed rate data generated by the cutting feed rate data generation unit, and a controller that outputs the CL data stored in the CL data memory and the cutting feed rate data stored in the cutting feed rate data memory to the driving unit of the machine tool to cause relative movement of the work and the cutting tool at the cutting feed rate in each part of the tool path along the tool path of the CL data.

Meritorious Effect of the Invention

In the machine tool control system according to the present invention, the CL data inclusive of the tool path is generated by the CL data generating unit based on the shape data regarding the post-machining shape of the work. The cutting feed rate data in each part on the tool path of the CL data is then generated by the cutting feed rate generating unit based on the CL data and the driving capability data regarding the driving capability of the driving unit of the machine tool. The controller then directly outputs the CL data and the cutting feed rate data to the driving unit of the machine tool. It is thus possible to cause relative movement between the work and the tool at an optimum cutting feed rate at each part of the tool path along the tool path.

Thus, with the control system for the machine tool according to the present invention, the operating speed may be higher than in the conventional system to reduce the machining time. Moreover, in the machine tool control system of the present invention, the as-machined work, for example, its corner, may be machined as intended by the designer, thereby improving machining accuracy of the machine tool.

BRIEF DESCRIPTION OF THE DRAWINGS

FIG. 5 is a graph showing the relationship between tj(s) and the parameter s of the equation (2).

DESCRIPTION OF THE PREFERRED EMBODIMENTS

The machine tool control system according to the present invention will now be described in detail with reference to the drawings.

Figure 1:
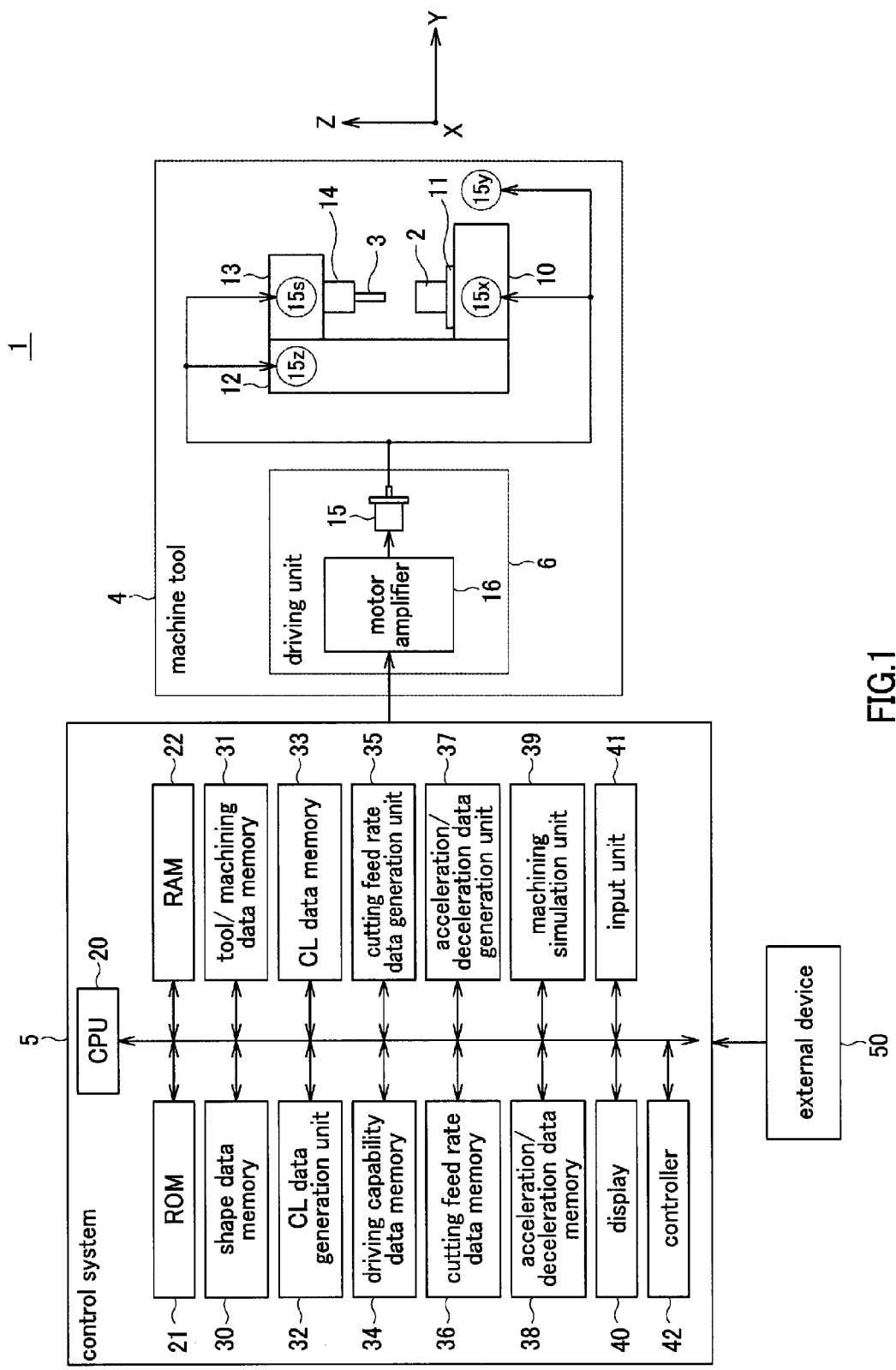
FIG. 1 is a block diagram of a machining system provided with a control system according to the present invention.

FIG. 1 depicts a block diagram showing an arrangement of a system for machining operations 1 provided with the machine tool control system according to the present invention. Referring to FIG. 1, the system for machining operations 1 includes a machine tool 4, and a control system 5 that controls the machine tool 4. In the machining system 1, a work 2 as an object of the machining operations is cut to a desired shape with a cutting tool 3 as the work 2 and the cutting tool 3 are moved relative to each other.

The machine tool 4 is a vertical type machining center having three linear driving axes, that is, X-, Y- and Z-axes, perpendicular to one another, as shown in FIG. 1. Specifically, the machine tool 4 includes a machine table 11, a machining head 13 and a main spindle 14. The machine table 11 is movably carried on a head 10, as a support block, for movement in two directions, that is, in an X-axis direction and a Y-axis direction, perpendicular to each other within a horizontal plane. The machining head 13 is carried by a column 12, mounted upright on one end of the head 10, for facing an upper part of the machine table 11 for movement in a plumb-line direction, that is, along the Z-axis direction. The main spindle 14 is mounted depending from the machining head 13. The cutting tool 3, such as an end mill, is detachably fitted to the main spindle 14.

The machine table 11 is driven in the X-axis direction and in the Y-axis direction, in response to rotation of a feed screw shaft, not shown, driven by table feed motors 15$x$, 15$y$. The machining head 13 is moved in the Z-axis direction in response to rotation of a feed screw shaft, not shown, driven by a cutting tool feed motor 15$z$. Further, the main spindle 14 is connected to a main spindle motor 15$s$ and is run in rotation about the Z-axis, along with the cutting tool 3 mounted to the lower end of the main spindle, in response to rotation of the main spindle motor 15$s$. For example, the table feed motors 15$x$, 15$y$, tool feed motor 15$z$ and the main spindle motor 15$s$ are servo-motors. Note that the table feed motors, 15$x$, 15$y$, tool feed motor 15$z$ and the main spindle motor 15$s$ are also referred to below simply as driving motors 15.

The machine tool 4 also includes a motor amplifier 16 that drives the driving motor 15. The motor amplifier 16 directly inputs a driving command from the control system 5 via an input/output interface, not shown. On receiving the driving command, the motor amplifier 16 converts acceleration/deceleration data, as later explained, into a driving current to amplify the current to drive the driving motors 15. The driving motors 15 and the motor amplifier 16 are also referred to below collectively as a driving unit 6.

In the machine tool 4, designed and constructed as described above, the cutting tool 3 is run in rotation by the main spindle motor 15$s$ in response to the driving command received by the motor amplifier 16 from the driving system 5. At the same time, the machine table 11 is moved by the table feed motors 15$x$, 15$y$ in the X-direction and/or in the Y-direction, while the machining head 13 is moved by the tool feed motor 15$z$ in the Z-axis direction. The machine tool 4 thus causes relative movement between the work 2 and the cutting tool 3, mounted on the machine table 11, such as to cut the work 2 to a desired shape by the cutting tool 3.

Referring to FIG. 1, the control system 5 is comprised of, for example, a general-purpose computer which is distinct from the machine tool 4 and which includes a CPU 20, a ROM 21, a RAM 22 and so forth. The control system further includes a shape data memory 30, a tool/machining data memory 31, a CL (Cutter Location) data generation unit 32, a CL data memory 33, a driving capability data memory 34, a cutting feed rate data generation unit 35, a cutting feed rate data memory 36, an acceleration/deceleration data generation unit 37, an acceleration/deceleration data memory 38, a machining simulation unit 39, a display 40, an input unit 41 and a controller 42.

The CL data generation unit 32, cutting feed rate data generation unit 35, acceleration/deceleration data generation unit 37, machining simulation unit 39 and the controller 42 may be implemented by the CPU 20 of the general-purpose computer. The shape data memory 30, tool/machining data memory 31, CL data memory 33, driving capability data memory 34, cutting feed rate data memory 36 and the acceleration/deceleration data memory 38 are made up by a memory of the general-purpose computer and by an external memory.

On receiving shape data from an external device 50, distinct from the machine tool 4 and the control system 5, and operating as a computer-aided design system (so-called CAD device), the shape data memory 30 transiently holds input shape data. The shape data, generated by the external device 50, may, for example, be data on the ultimate shape, size and finishing surface accuracy of the work 2, obtained by the machining operations, material quality of the work 2, shape of the work 2 before the machining operations, or on the mass weight of the work 2. These shape data are delivered to the shape data memory from a recording medium, such as a magnetic disc, an optical disc, a magneto-optical disc or a semiconductor memory, or from the external device 50 over e.g., a network.

In the tool/machining data memory 31, data on machining conditions are stored via a variety of recording mediums or over a network, as in the above mentioned shape data memory 30. Examples of the data on machining conditions include data on the machining mode, such as contour line machining, scanning line machining, linear interpolation, arcuate interpolation or the operation of evading pneumatic cutting, data on sorts of cutting tools, such as types or materials of the cutting tools. Other examples include diameters of the cutting tools, cutting speeds, as set from one cutting tool sort to another depending on the material type of the work 2, amounts of cut per revolution or tolerances as set from one tool sort to another depending on the material types of the work 2.

The CL data generation unit 32 reads out the shape data stored in the shape data memory 30 and the data on machining conditions stored in the tool/machining data memory 31 to generate CL data inclusive of a movement path of the cutting tool 3 on the work 2. The CL data generation unit 32 outputs the so generated CL data to the CL data memory 33 to store the data temporarily in the CL data memory 33.

In the driving capability data memory 34, as in the above mentioned shape data memory 30 and in the above mentioned tool/machining data memory 31, there are stored driving capability data concerning the driving capability of the driving motors 15 of the driving unit 6 via a variety of recording mediums and over networks. These driving capability data may, for example, be data on the torques of the driving motors 15, such as the starting torque, stalling torque (maximum torque) or the rated torque of each of the table feed motors 15$x$, 15$y$, tool feed motor 15Z or the main spindle motor 15$s$.

The cutting feed rate data generation unit 35 reads out the CL data, stored in the CL data memory 33, the mass weight of the work being cut 2 mounted on the machine table 11 stored in the shape data memory 30 and the driving capability data stored in the driving capability data memory 34 to generate the cutting feed rate data that will give the maximum speed at each part of the tool path of CL data. The cutting feed rate data generation unit 35 outputs the so generated cutting feed rate data to the cutting feed rate data memory 36 to store the data temporarily in the cutting feed rate data memory 36. The sequence for the cutting feed rate data generation unit 35 to generate the cutting feed rate data that will provide the maximum speed at each part of the tool path of the CL data will be explained subsequently.

The acceleration/deceleration data generation unit 37 reads out the CL data stored in the CL data memory 33 and the cutting feed rate data stored in the cutting feed rate data memory 36. Based on the CL data and the cutting feed rate data, the acceleration/deceleration data generation unit generates acceleration/deceleration data representing the relative acceleration or deceleration between the work 2 and the cutting tool 3. The acceleration/deceleration data generation unit 37 outputs the so generated acceleration/deceleration data to the acceleration/deceleration data memory 38 to store the data temporarily in the acceleration/deceleration data memory 38.

The machining simulation unit 39 reads out the CL data stored in the CL data memory 33 and the cutting feed rate data stored in the cutting feed rate data memory 36 or the acceleration/deceleration data stored in the acceleration/deceleration data memory 38 to perform machining simulation of causing relative movement between the work 2 and the cutting tool 3. The machining simulation unit 39 calculates the time needed in machining the work 2 by the cutting tool 3 to a desired shape, and outputs the result of the machining simulation and the machining time to the display 40.

The display 40 is made up of, for example, a CRT display or a liquid crystal display, and demonstrates the result of the machining simulation, carried out by the machining simulation unit 39, machining time, the above mentioned cutting feed rate data or the acceleration/deceleration data.

The input unit 41 includes a keyboard, a mouse or a touch panel, operated by an operator of the machine tool 4. With the input unit 41, the operations of selecting desired data from the data stored in the respective memories, allowing each generation unit to generate data, allowing startup of machining by the machine tool 4 or editing stored or generated data, are carried out by the operator.

If the result of the simulation, machining time and so forth, indicated on the display 40, is conformant to the designer's intention, and the input unit 41 has carried out the operation of allowing startup of the machining by the operator, the controller 42 reads out the acceleration/deceleration data stored in the acceleration/deceleration data memory 38. The controller 42 directly outputs the acceleration/deceleration data and a driving command to the motor amplifier 16 of the driving unit 6.

In the control system 5, designed and constructed as described above, the CL data generation unit 32 generates the CL data based on shape data and machining condition data. The cutting feed rate data generation unit 35 generates cutting feed rate data, which becomes a maximum speed at each part of the tool path of the CL data, based on the CL data, mass weight of the work being cut 2 mounted on the machine table 11 and on the driving capability data. The acceleration/deceleration data generation unit 37 generates acceleration/deceleration data based on the CL data and the cutting feed rate data. The controller directly outputs the acceleration/deceleration data and a driving command to the motor amplifier 16 of the driving unit 6. The controller thus causes relative movement between the work 2 and the cutting tool 3 on the machine tool 4 at a cutting feed rate which becomes a maximum speed at each part of the tool path, along the tool path, in order to cut the work 2 to a desired shape by the cutting tool 3.

The sequence of operations in which the cutting feed rate data generation unit 35 of the control system 5 generates the cutting feed rate data in such a manner that the cutting feed rate will become maximum at each part of the tool path of the CL data will now be explained with reference to FIGS. 2 to 7.

Figure 2:
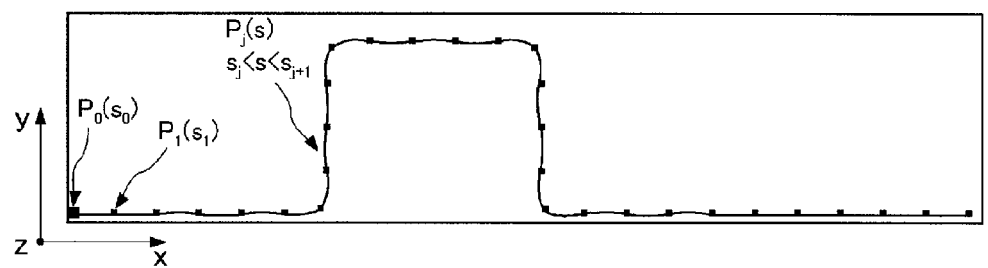
FIG. 2 is a diagrammatic view showing a tool path.

Such an example case in which a corner part of the work 2, mounted on the machine table 11, is machined in a cutting mode (mode G64) of starting the machining operation by one of the X-axis driving shaft and the Y-axis driving shaft before cessation of the other driving shaft, as shown in FIG. 2, is explained. It is noted that, although the machine tool 4 has three driving shafts of the linear movement of X-axis, Y-axis and Z-axis driving shafts, the following explanation will be made in terms of two dimensions of the X-axis and Y-axis directions.

FIG. 2 shows a curvilinear tool path generated by the CL data generator 32. It is noted that points entered on the curve represent control points. The curve is a third-order splined curve, for example, and may be differentiated with second-order differentiation. The curve may also be a Nurbs curve or a B-splined curve.

Such third-order splined curve $p_j(s)$, where s denotes a parameter, may be represented by the following equation (1):

$$P_j(s):(x_j(s), y_j(s)) \quad (1)$$

where $$x_j(s) = a_{xj} + b_{xj}(s-s_j) + c_{xj}(s-s_j)^2 + d_{xj}(s-s_j)^3$$

and $$y_j(s) = a_{yj} + b_{yj}(s-s_j) + c_{yj}(s-s_j)^2 + d_{yj}((s-s_h))^3$$

Note that $ax_j$, $ay_j$ denote constants at an initial value S0, and $bx_j$, $by_j$ denote constants at the first-order differentiation. That is, these are constants obtained on partial differentiation with x and y, $c_{xj}$ and $c_{yj}$ are constants in the second-order differentiation and $d_{xj}$, $d_{yj}$ are constants in the third-order differentiation.

Figure 3:
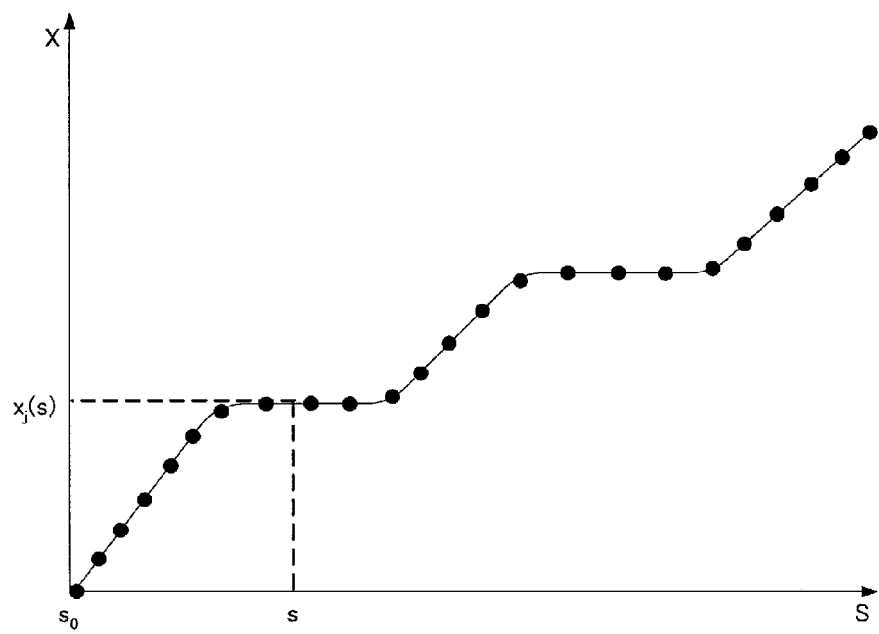
FIG. 3 is a diagrammatic view showing the relationship between X-coordinate values Xj(S) of pj(s) of the equation (1) and a parameter s.
Figure 4:
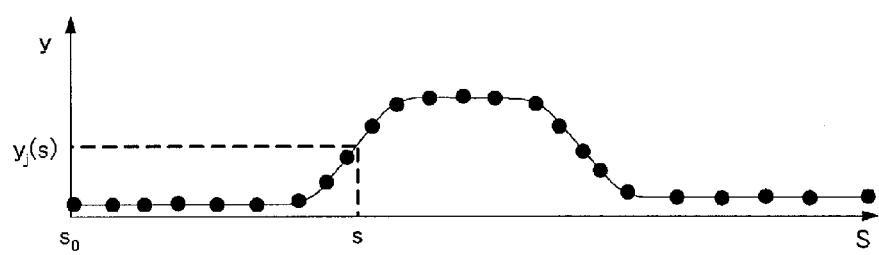
FIG. 4 is a diagrammatic view showing the relationship between Y-coordinate values Yj(S) of pj(s) of the equation (1) and a parameter s.

Hence, a curve between a jth control point and a (j+1)st control point, out of the control points, is expressed by $p_j(s)$, and may be shown by an X-coordinate value $x_j(S)$ shown in FIG. 3 and a Y-coordinate value $y_j(S)$ shown in FIG. 3.

Given that, as a presupposition,

[Equation 1]

$$x_j(s_j) = x_j, y_j(s_j) = y_j: \quad (1)$$

passing through a control point;

$$x_j(s_{j+1}) = x_{j+1}(s_{j+1}) = x_{j+1},$$

$$y_j(s_{j+1}) = y_{j+1}(s_{j+1}) = y_{j+1}: \quad (2)$$

continuous $$x_j'(s_{j+1}) = x_{j+1}'(s_{j+1}),$$

$$y_j'(s_{j+1}) = y_{j+1}'(s_{j+1}): \quad (3)$$

first derivative value is continuous $$x_j''(s_{j+1}) = x_{j+1}''(s_{j+1}),$$

$$y_j''(s_{j+1}) = y_{j+1}''(s_{j+1}): \quad (4)$$

second derivative value is continuous $$x_0''(0) = x_{n-1}''(sn) = 0,$$

$$y_0''(0) = y_{n-1}''(sn) = 0: \quad (5)$$

second derivative values at beginning and terminal points are 0, it is possible to find constants $ax_j$, $bx_j$, $cx_j$, $dx_j$, $ay_j$, $by_j$, $cy_j$ and $dy_j$ in each domain.

Since the speed of movement is expressed by time changes of the parameter s, its inverse function t(s) may be defined by a curve that may be differentiated by second-order or higher-order differentiation, as indicated by the following equation (2), in the same way as by the above equation (1):

[Equation 2]

$$t_j(s) = a_{sj} + b_{sj}(s-s_j) + c_{sj}(s-s_j)^2 + d_{sj}(s-s_j)^3 \quad (2)$$

In the above mentioned machine tool 4, the machine table 11 is driven in the X-axis and Y-axis directions. Hence, the speed of relative movement between the work 2 and the cutting tool 3, the speed of movement of the machine table 11 in the X-axis direction Vx may be represented by the following equation (3):

[Equation 3]

$$Vx = \frac{dx_j(s)}{ds} \cdot \frac{ds}{dt} = \frac{dx_j(s)}{ds} \bigg/ \frac{dt}{ds} \quad (3)$$

and that in the Y-axis direction may be represented by the following equation (4):

[Equation 4]

$$Vy = \frac{dy_j(s)}{ds} \cdot \frac{ds}{dt} = \frac{dy_j(s)}{ds} \bigg/ \frac{dt}{ds} \quad (4)$$

Therefore, the cutting feed rate V is represented by the following equation (5):

[Equation 5]

$$V = \sqrt{Vx^2 + Vy^2} \quad (5)$$

Further, the acceleration Ax in the X-axis direction of the machine table 11 may be represented by the following equation (6), and the acceleration Ay in the Y-axis direction of the machine table 11 may be represented by the following equation (7):

[Equation 6]

$$Ax = \frac{d^2 x_j(s)}{ds^2} \cdot \frac{d^2 s}{dt^2} = \frac{d^2 x_j(s)}{ds^2} \bigg/ \frac{d^2 t}{ds^2} \quad (6)$$

[Equation 7]

$$Ay = \frac{d^2 y_j(s)}{ds^2} \cdot \frac{d^2 s}{dt^2} = \frac{d^2 y_j(s)}{ds^2} \bigg/ \frac{d^2 t}{ds^2} \quad (7)$$

In the machine table 4, in which the machine table 11 is moved in the X-axis direction and/or the Y-axis direction at an X-axis movement speed Vx, a Y-axis movement speed Vy, an X-axis acceleration Ax and a Y-axis acceleration Ay, it is necessary for table feed motors 15x and 15y to develop a torque lesser than rated torques for fear of malfunctions or excess heating of the table feed motors 15x and 15y. It is noted that the table feed motor 15x drives the machine table 11 in the x-axis direction, whilst the table feed motor 15y drives the machine table 11 in the y-axis direction.

If the tool path defined by Pj(s), shown in FIG. 2, that is, the post-machining shape of the work 2, may not be changed, the shape of tj(s) of the equation (2), that is, the control point positions, may be changed to control the speed of movement Vx, Vy as well as the acceleration Ax, Ay.

Figure 5:
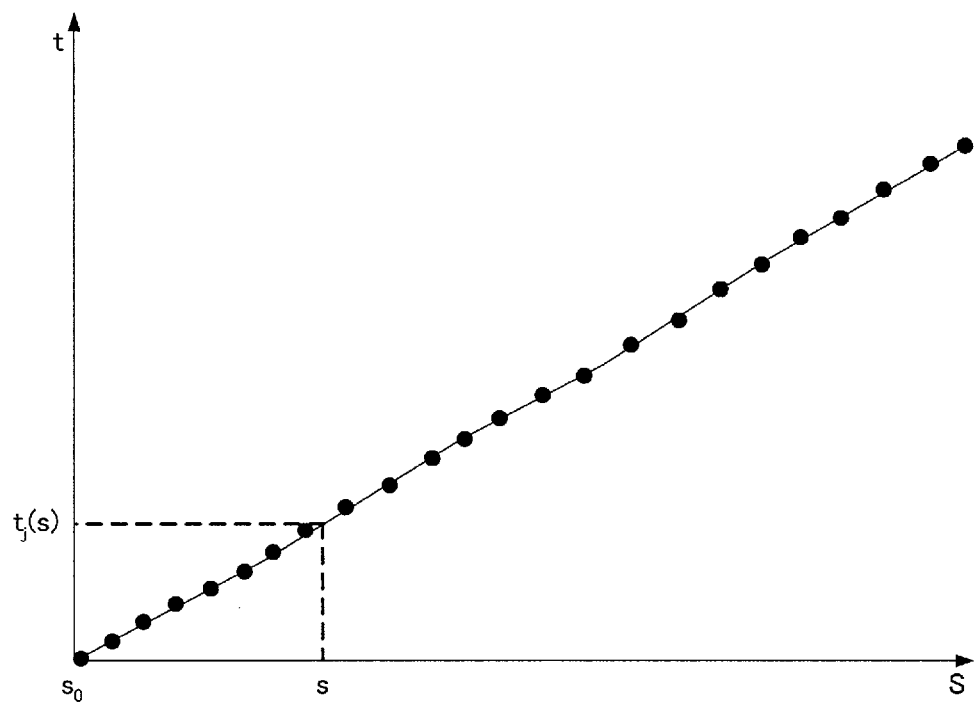
FIG. 5 is a diagrammatic view showing the relationship between tj(s) of the equation (2) and a parameter s.
Figure 6:
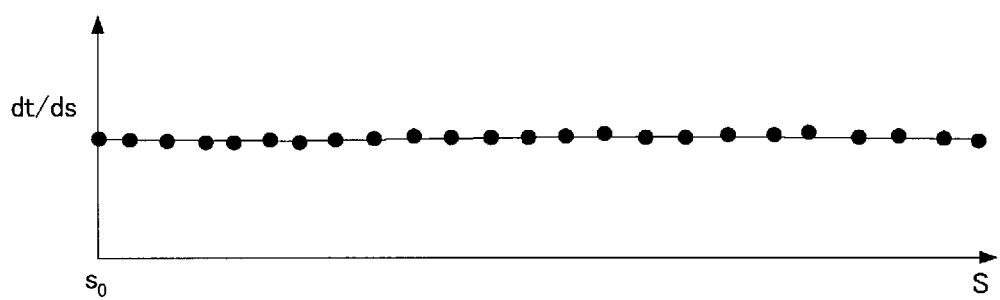
FIG. 6 is a graph showing the values of dt/ds.

Since t denotes time, the shape of tj(s) of the equation (2) is to be changed as long as tj(s) is a linear increasing function, shown in FIG. 5. To this end, it is easier to change the value of tj(s) of the equation (2) in a positive value range than changing tj(s) itself, shown in FIG. 6.

Based on the above concept, such a cutting feed rate V that will yield the maximum values of the speeds of movement Vx, Vy, with the acceleration values Ax, Ay being lower than that corresponding to the rated torque, are found.

The sequence of operations to find the cutting feed rate V will now be explained with reference to the flowchart of FIG. 7.

Figure 7:
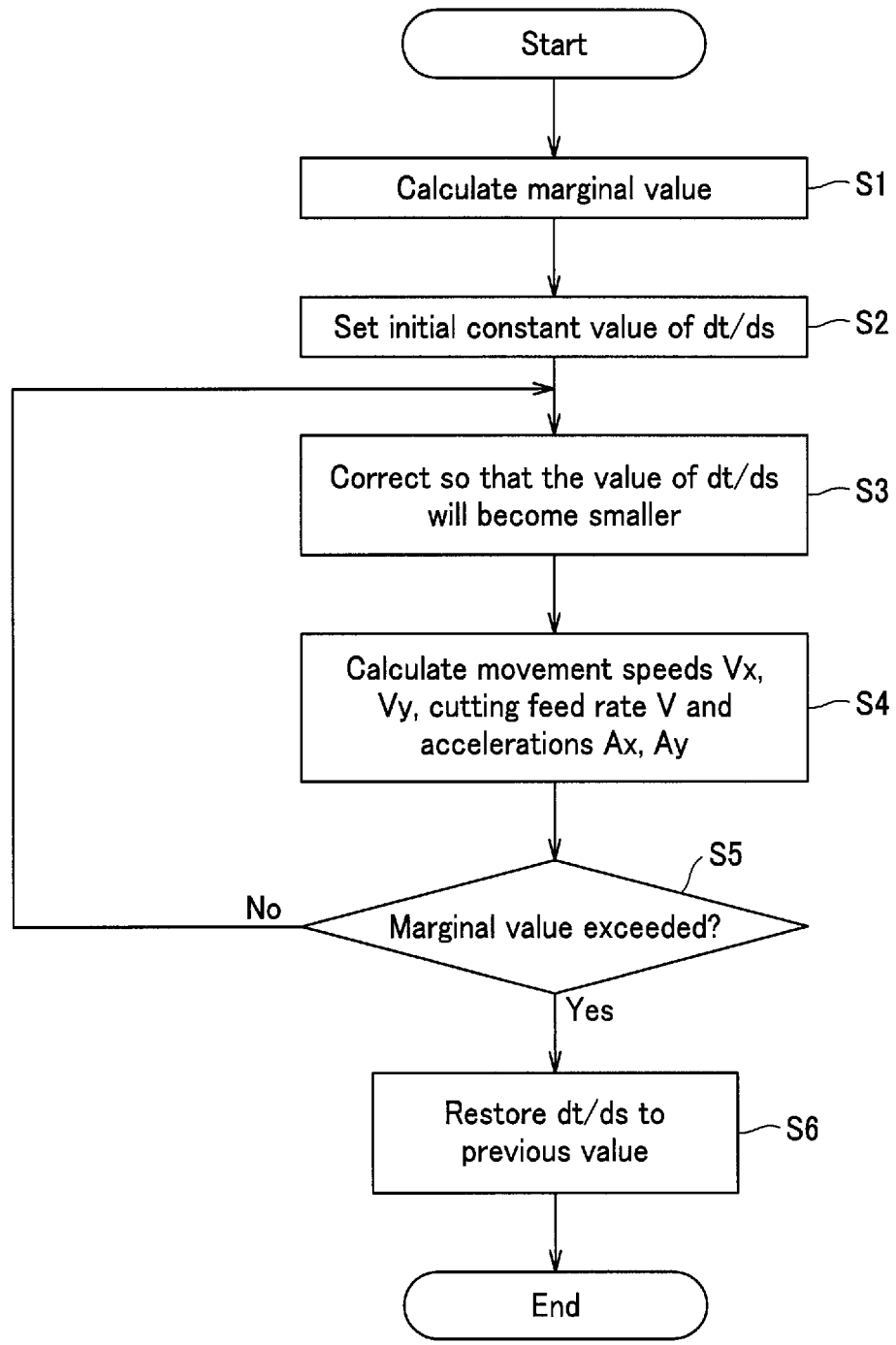
FIG. 7 is a flowchart showing the sequence of operations to find the cutting feed rate.

Referring to FIG. 7, in a step S1, the cutting feed rate data generation unit 35 reads out the mass weight of the work being cut, stored in the shape data memory 30, and the rated torques of the table feed motors 15x, 15y, stored in the driving capability data memory 34. The cutting feed rate data generation unit then calculates marginal speeds Lv, −Lv and marginal accelerations La, −La. The marginal speeds Lv, −Lv and marginal accelerations La, −La are sometimes referred to below as marginal values.

Then, in a step S2, the cutting feed rate data generation unit 35 sets an initial value of tj(s) of the equation (2) so that dt/ds, referred to above, will be a constant value of a proper magnitude. This constant value is also referred to below as an initial constant value. Since dt/ds corresponds to a reciprocal of the speed, the initial constant value of dt/ds is set so that the speeds of movement Vx, Vy as well as the acceleration La, −La will not get to the marginal values of the table feed motors 15x, 15y. That is, the initial constant value of dt/ds is set so that the speeds of movement Vx, Vy will be within the range of the marginal speeds Lv and −Lv and so that the accelerations Ax, Ay will be within the range from the marginal accelerations La and −La.

Then, in a step S3, the current value of the control point of tj(s) of the equation (2) is set so that the current value of dt/ds will be smaller on the whole by a preset value. By so doing, the inclination of a straight line in FIG. 5 showing the relationship between t (vertical axis) and s (horizontal axis) in connection with tj(s) of the equation (2), becomes more moderate, that is, the speed of movement is increased.

Then, in a step S4, the cutting feed rate data generation unit 35 calculates the speeds of movement Vx, Vy and the accelerations Ax, Ay. Then, in a step S5, the cutting feed rate data generation unit 35 compares the speeds of movement Vx, Vy and the accelerations Ax, Ay, as calculated, to the marginal values of the table feed motors 15x, 15y to decide whether or not the speeds of movement Vx, Vy as well as the accelerations Ax, Ay have exceeded the marginal values.

If, in the step S5, the speeds of movement Vx, Vy as well as the accelerations Ax, Ay are not in excess of the marginal values, processing reverts to the step S3 to correct the position of the control point tj(s) of the equation (2) so that the value of dt/ds will be further smaller by the same preset value If conversely the speeds of movement Vx, Vy as well as the accelerations Ax, Ay are in excess of the marginal values, in the step S6, the value of dt/ds in the vicinity of the point of exceeding the marginal value is restored to the directly previous value. Processing then comes to a close.

By the above sequence of operations, the cutting feed rate data generation unit 35 may get the cutting feed rate V of a maximum value for a torque not greater than the rated torques of the table feed motors 15x, 15y, that is, with the speeds of movement Vx, Vy being within the range of the marginal speeds Lv, −Lv and with the accelerations Ax, Ay being within the range of the marginal accelerations La, −La.

Figure 8:
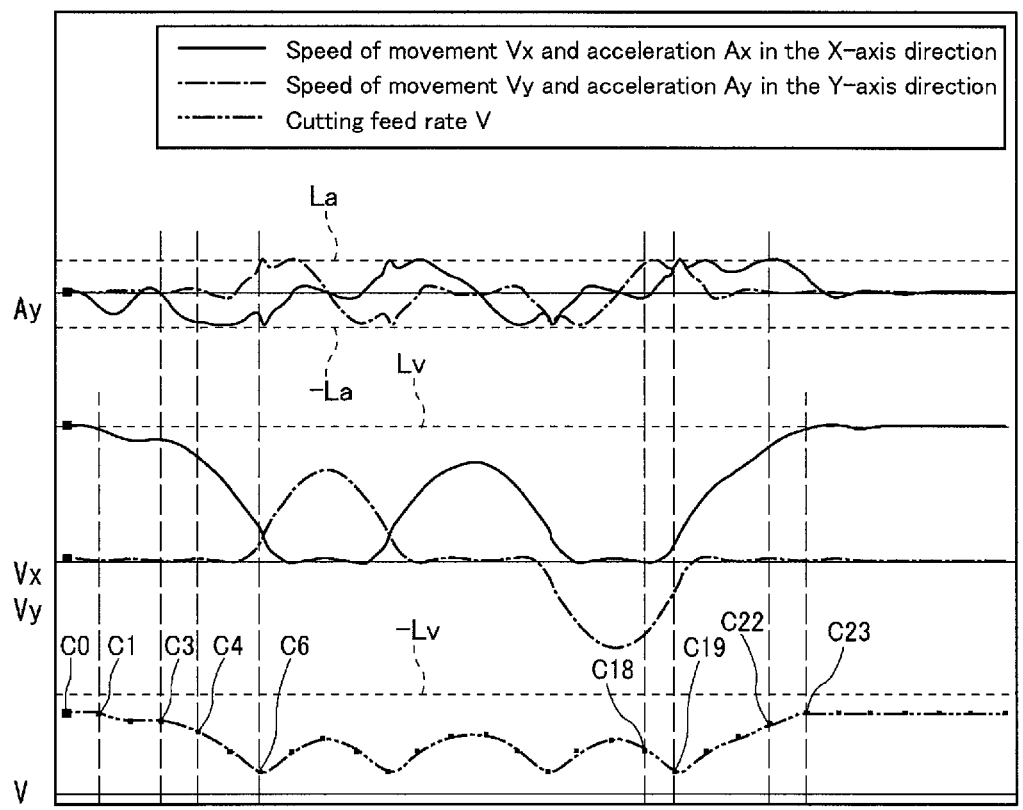
FIG. 8 is a graph showing the speeds of movement Vx, Vy in the X-axis and Y-axis directions, accelerations Ax, Ay in the X-axis and Y-axis directions and the cutting feed rate V.

FIG. 8 shows speeds of movement Vx, Vy, accelerations Ax, Ay and the cutting feed rate V. Note that, in FIG. 8, the acceleration Ax and the speed of movement Vx in the X-axis direction are indicated by solid lines, the acceleration Ay and the speed of movement Vy in the Y-axis direction are indicated by chain dotted lines and the cutting feed rate V is indicated by a double-chain dotted line.

It is seen from FIG. 8 that, in the X-axis direction, deceleration is commenced at, for example, a third control point c3, and that, as from a fourth control point c4 as far as the sixth control point c6, deceleration is continued at approximately the marginal acceleration −La. This enables the speed of movement Vx from the control point c0, that is, an initial value (0th control point), to the first control point c1, to be set at the marginal speed Lv. Furthermore, in the X-axis direction, acceleration is commenced at, for example, an 18th control point c18, and continued from the 19th control point down to the 22nd control point c22 at approximately the marginal acceleration La. This enables the speed of movement Vx as from the 23rd control point c23 to be set at the marginal speed Lv.

Figure 9:
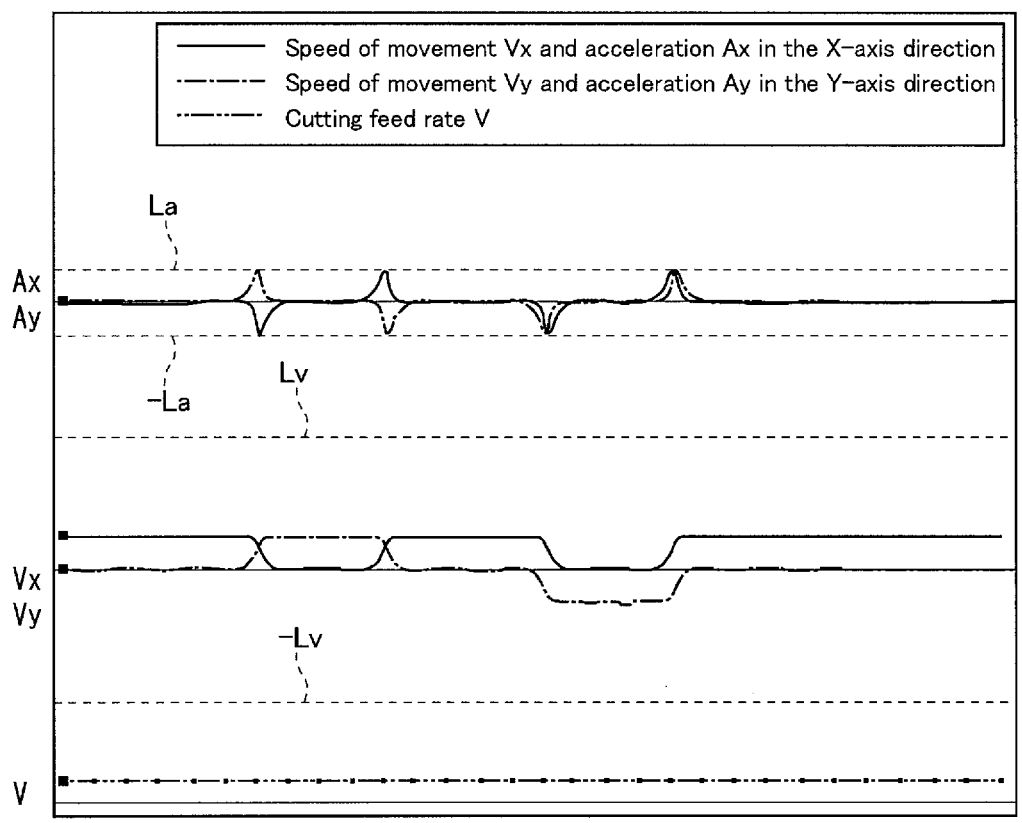
FIG. 9 is a graph showing the speeds of movement Vx, Vy in the X-axis and Y-axis directions, accelerations Ax, Ay in the X-axis and Y-axis directions and the cutting feed rate V in case a cutting tool moves along a tool path at a constant cutting feed rate V as conventionally.

For comparison sake, FIG. 9 shows the speeds of movement Vx, Vy and the accelerations Ax, Ay in the X-axis direction and in the Y-axis direction, as well as the cutting feed rate V, in case the work is moved along the tool path at a constant cutting feed rate, as in a conventional system. Note that, in FIG. 9, the acceleration Ax and the speed of movement Vx in the X-axis direction are denoted by solid lines, the acceleration Ay and the speed of movement Vy in the Y-axis direction are denoted by chain dotted lines and the cutting feed rate V is denoted by a double dotted chain line.

It is seen from FIG. 9 that, although the accelerations Ax, Ay have reached the marginal values La, −La, the speeds of movement Vx, Vy are appreciably lower than the marginal values Lv, −Lv.

That is, as may be seen from FIGS. 8 and 9, it is possible with the control system 5 to set the integrated value of the cutting feed rate V so as to be appreciably larger than the integrated value of the conventional cutting feed rate V shown in FIG. 9. This provides for machining time with the control system 5 which is shorter than in the conventional system.

Figure 10:
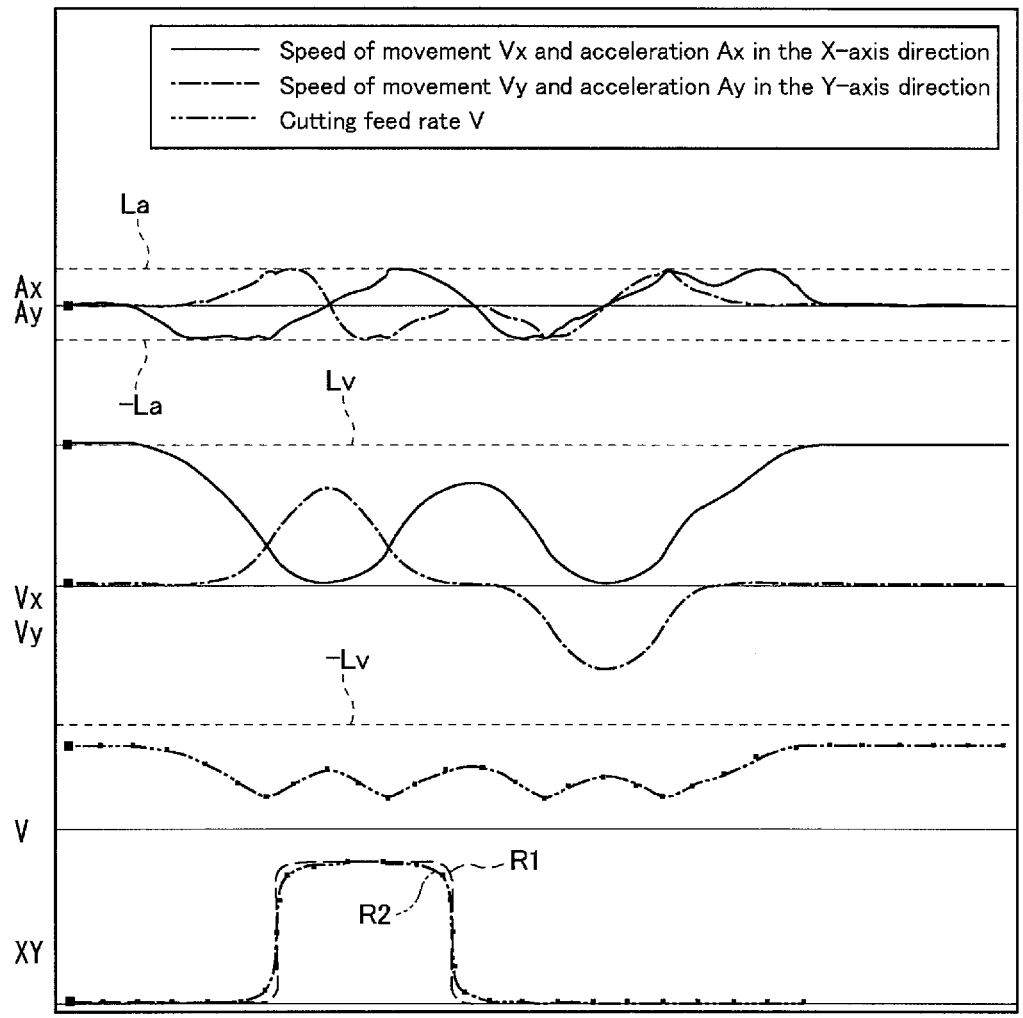
FIG. 10 is a graph showing the speeds of movement Vx, Vy in the X-axis and Y-axis directions, accelerations Ax, Ay in the X-axis and Y-axis directions and the cutting feed rate V in case the radius of curvature of the tool path is changed and the deceleration is in a decreased state.

It is noted that, in the control system 5, the machining simulation unit 39 is able to verify and evaluate the speeds of movement Vx, Vy, accelerations Ax, Ay and the cutting feed rate V at the outset. Thus, in case the shape of the as-cut work 2, in particular the corner part of the work 2, may be changed within the range of the tolerance, the control system 5 may cause the input unit 41 to change the radius of curvature from R1 to a larger value of R2, as shown for example in FIG. 10. By so doing, a cutting feed rate with reduced deceleration may be generated to allow the machine tool 4 to perform machining operations at a higher speed.

In the control system 5 for the machine tool, according to the present invention, the cutting feed rate data generation unit 35 is able to generate cutting feed rate data at the outset based on CL data, mass weight of the work 2 being cut and the values of the rated torque of the driving motors 15 of the driving unit 6 of the machine tool 4. The cutting feed rate of the cutting feed rate data is of such a value that will provide the maximum speed for the torque of the table feed motors 15x, 15y not greater than their rated torque values, that is, for the speeds of movement Vx, Vy within the range between the marginal speeds Lv and −Lv for the work being cut, and for the accelerations Ax, Ay within the range between the marginal accelerations La and −La for the work 2 being cut. It is thus possible with the control system 5 for the machine tool of the present invention to perform machining operations at a higher speed and shorter machining time than with the conventional system. It is moreover possible with the control system 5 for the machine tool of the present invention to verify cutting feed rate data that will provide for the maximum speed of the machine tool 4.

Moreover, in the control system 5 for the machine tool according to the present invention, the acceleration/deceleration data generation unit 37 generates acceleration/deceleration data based on the CL data and the cutting federate data. The controller 42 directly outputs the acceleration/deceleration data and a driving command to the motor amplifier 16, which motor amplifier then actuates the driving motors 15 of the driving unit 6 of the machine tool 4 in accordance with the input acceleration/deceleration data and the driving command. Hence, in the machine tool 4, the work 2 and the cutting tool 3 may be moved relative to each other along the tool path at the cutting feed rate V which will become a maximum speed at each part of the tool path as verified at the outset. It is thus possible with the control system 5 of the machine tool according to the present invention to cut the corner part of the work 2 to a shape a designer intended at the outset, and hence to improve the machining accuracy of the machine tool 4.

Moreover, in the control system 5 for the machine tool according to the present invention, the machining simulation unit 39 is able to perform machining simulation in which the work 2 and the cutting tool 3 are relatively moved based on the CL data and the cutting feed rate data or on acceleration/deceleration data. The machining simulation unit then demonstrates the results of the simulation on the display 40 to allow the cutting feed rate data and the overall operation of the machine tool 4 to be verified extremely readily.

Figure 11:
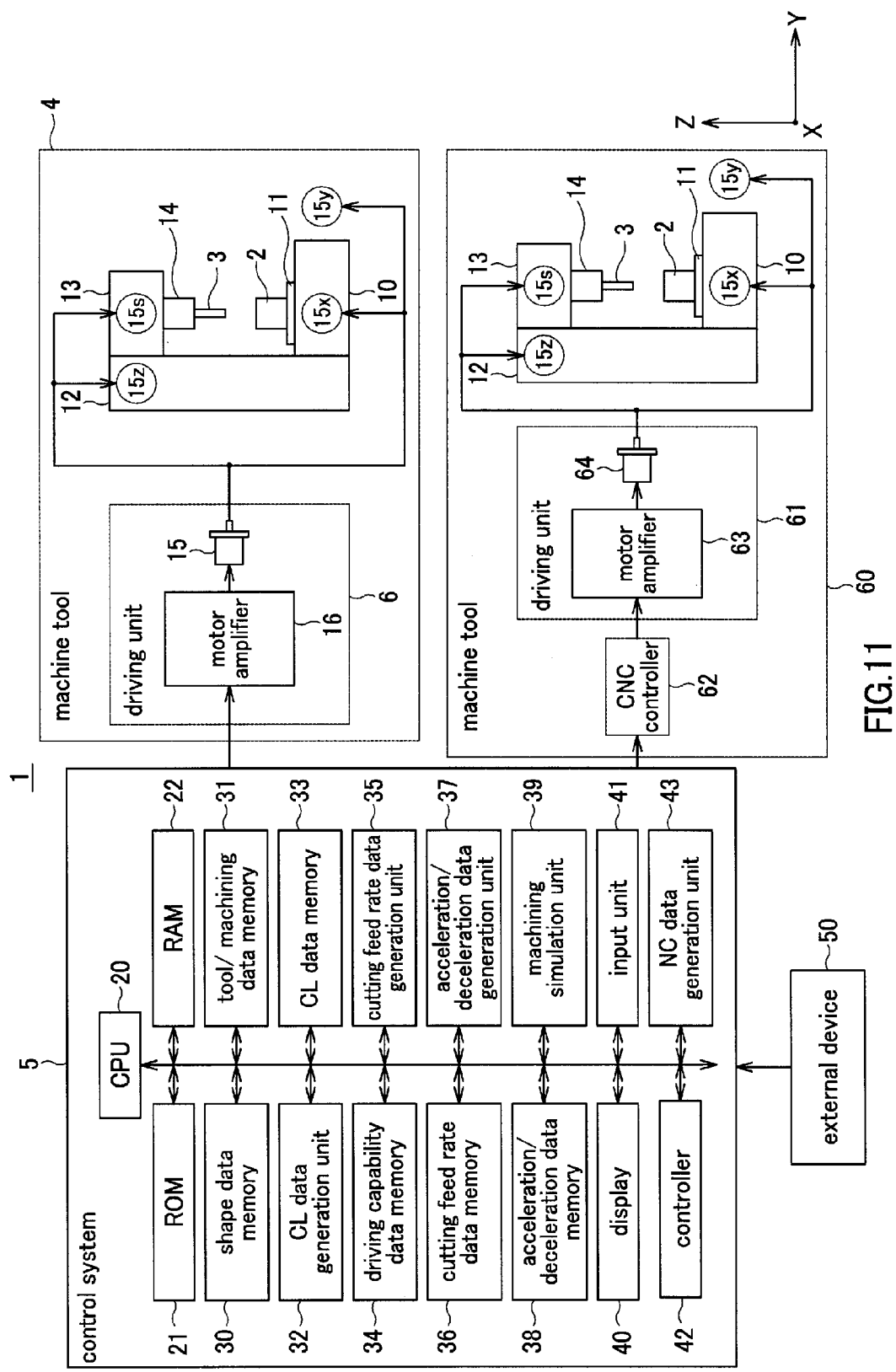
FIG. 11 is a block diagram of a modification of a machining system provided with a control system according to the present invention.

Referring to FIG. 11, the control system 5 for the machine tool according to the present invention may further be provided with an NC data generation unit 43 that generates NC data, composed of an NC program, termed 'G code', based on the CL data stored in the CL data memory 33. Suppose that, like a conventional machine tool 60 shown for example in FIG. 11, a machine tool as an output destination includes a CNC controller 62 that controls a driving unit 61 based on NC data. In the control system 5, the NC data generation unit 43 generates NC data, and the controller 42 outputs the NC data to the CNC controller 62 of the conventional machine tool 60. On receiving the NC data, the CNC controller 62 actuates the driving motor 64, via a motor amplifier 63, in accordance with the input NC data. That is, the control system 5 for the machine tool is able to actuate and control both the machine tool 4 and the conventional machine tool 60. The machine tool 4 actuates the driving motors 15 by the motor amplifier 16 in accordance with the input driving command, while the conventional machine tool 60 includes the CNC controller 62 that actuates the driving motor 64 in accordance with the input NC data.

Each of the machine tools 4, 60 of the machine tool control system 5 according to the present invention is not limited to the vertical type machining center including three linear-movement driving axes of X-, Y- and Z-axes perpendicular to one another. Each of the machine tools may thus be a horizontal type machining center including three linear-movement driving axes of X-, Y- and Z-axes. Each of the machine tools may also be a 5-axis machining centers including three linear-movement driving axes of X-, Y- and Z-axes perpendicular to one another and two rotational driving axes about two selected out of the three linear-movement driving axes as center of rotation. Each of the machine tools may further be a 5-axis control complex machining device including an NC lathe as a basic unit and a main spindle rotationally mounted on the NC lathe to perform milling operations.

It should be understood by those skilled in the art that various modifications, combinations and alterations may occur depending on design requirements and other factors insofar as they are within the scope of the appended claims or the equivalents thereof.

What is claimed is:

1. A control system for a machine tool in which data driving a driving unit of the machine tool that causes relative movement between a work and a cutting tool is generated and output to the driving unit to control the machine tool, the control system comprising:

a CL data generating unit that generates CL (Cutter Location) data including a tool path in a work coordinate system based on shape data regarding a post-machining shape of the work;

a CL data memory that stores the CL data generated by the CL data generating unit;

a driving capability data memory that memorizes from the outset driving capability data regarding torques of the driving motors of the driving unit of the machine tool;

a cutting feed rate data generation unit that, based on the CL data stored in the CL data memory and on the driving capability data stored in the driving capability data memory, generates cutting feed rate data in each part of the tool path of the CL data;

a cutting feed rate data memory that memorizes the cutting feed rate data generated by the cutting feed rate data generation unit; and a controller that outputs the CL data stored in the CL data memory and the cutting feed rate data stored in the cutting feed rate data memory to the driving unit of the machine tool to cause relative movement of the work and the cutting tool at the cutting feed rate in each part of the tool path along the tool path of the CL data, wherein the cutting feed rate data generation unit generates the cutting feed rate data, based on the mass of the work and rating data of the torques of the motors of the driving unit, by setting the position of the control points of the inverse function of the speed of movement, so that maximum cutting feed rate data will be provided.

2. The control system for a machine tool according to claim 1, further comprising:

a machining simulation unit that, based on the CL data and the cutting feed rate data, carries out machining simulation in which the work and the cutting tool are virtually moved relative to each other; and a display that demonstrates the result of the machining simulation carried out by the machining simulation unit.

3. The control system for a machine tool according to claim 1, further comprising:

an acceleration/deceleration data generation unit that, based on the CL data stored in the CL data memory and the cutting feed rate data stored in the cutting feed rate data memory, generates acceleration/deceleration data representing relative acceleration or deceleration between the work and the cutting tool; and an acceleration/deceleration data memory that memorizes the acceleration/deceleration data generated by the acceleration/deceleration data generation unit, the controller outputting a driving command to the driving unit of the machine tool based on the acceleration/deceleration data stored in the acceleration/deceleration data memory.

4. The control system for a machine tool according to claim 3, further comprising:

a machining simulation unit that, based on the CL data and the cutting feed rate data or the acceleration/deceleration data, carries out machining simulation in which the work and the cutting tool are virtually moved relative to each other; and a display that demonstrates the result of the machining simulation carried out by the machining simulation unit.

5. The control system for a machine tool according to claim 1, wherein, in case the machine tool includes a CNC control unit that controls the driving unit based on the CL data, the control system for the machine tool further comprising:

an NC (numerical control) data generation unit that generates the NC data based on the CL data, wherein the controller outputs the NC data generated by the NC data generation unit to the CNC control unit for the machine tool.

* * * * *